INVENTORS
John Z. DeLorean &
BY Albert E. Roller
W.C. Middleton
ATTORNEY

INVENTORS
John Z. DeLorean &
BY Albert E. Roller

W.C. Middleton
ATTORNEY

United States Patent Office 3,145,816
Patented Aug. 25, 1964

1

3,145,816
CLUTCHES
John Z. De Lorean and Albert E. Roller, Birmingham, Mich., assignors to General Motors Corporation, Detroit, Mich., a corporation of Delaware
Filed Aug. 21, 1961, Ser. No. 132,655
6 Claims. (Cl. 192—91)

This invention relates to clutches and more particularly to clutches interposed between the engine and transmission of an automotive vehicle.

As the bodies of automotive vehicles and, consequently, depending parts thereof have been lowered, ground clearance has been reduced. The clutch casing under these circumstances presents a problem and in order that the ground clearance of the fixed casing be increased, it is desirable that the clutch rotatable within the casing be made of smaller diameter than is usually customary with single disc plate clutches. In order that the ground clearance of the clutch casing can be increased, the present invention makes possible such increase by having the clutch made up of multi-plate discs of relatively small diameter and of such number as to be capable, when the clutch pack is compressed, to transmit the required torque. The invention also makes use of a clutch of such construction that the plates thereof are normally compressed to lock the input to the output by spring means and provision is made for releasing the clutch by the application of fluid pressure to a part of the pressure plate means. This fluid pressure may, if desired, be obtained by using engine lubricating oil under pressure. In addition, provision is made for supplying lubricating and cooling fluid to the clutch plates at all times for obvious purposes.

An object of the invention is to provide a spring applied fluid pressure released clutch of utmost simplicity.

Another object is to provide a clutch of the foregoing nature which employs a minimum number of parts.

A further object of the invention is to provide a passage for lubricating and cooling fluid to the components of the clutch.

Figure 1:
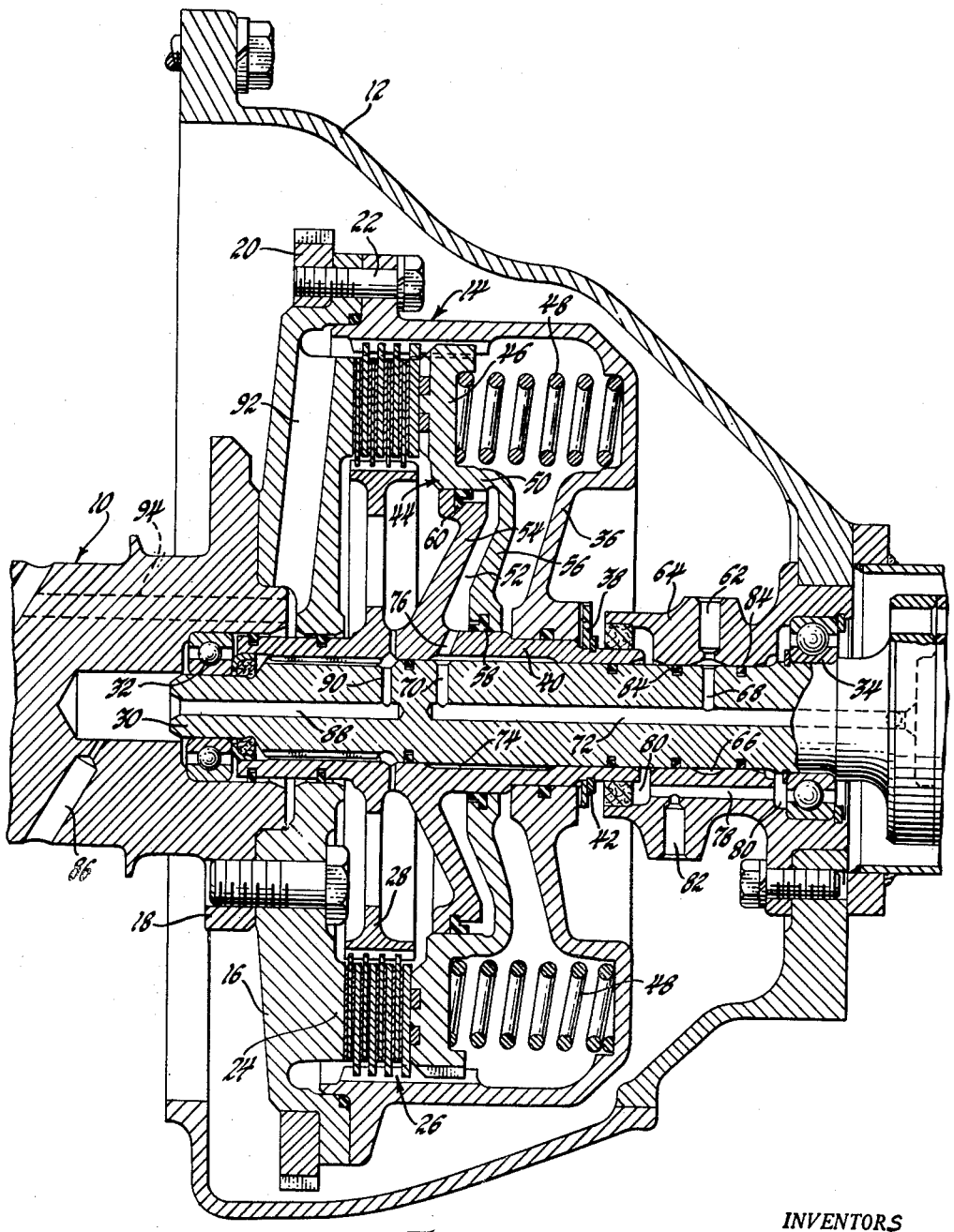
Figure 2:
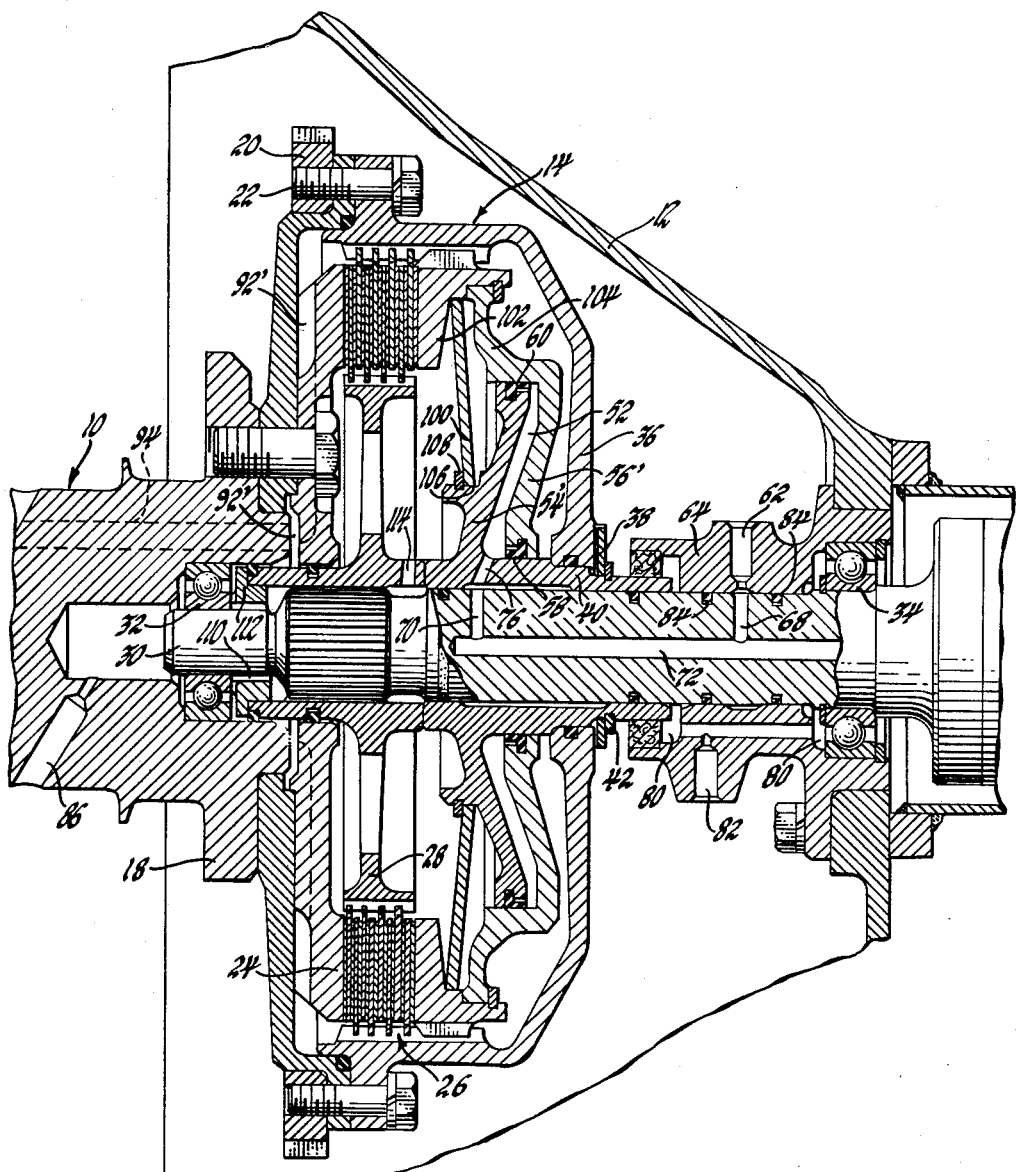

Other features, objects and advantages of the invention will become apparent by reference to the following detailed description of the accompanying drawings wherein:

FIGURE 1 is a vertical section of one embodiment of the clutch utilizing coil springs to apply the clutch; and FIGURE 2 is a similar view of another embodiment of the invention utilizing a Belleville spring washer for applying the clutch.

Referring to the drawings, and particularly to FIGURE 1, 10 indicates an input shaft which may be the crankshaft of an internal combustion engine utilized for driving a vehicle. The outer end of this crankshaft is enclosed in a stationary casing 12 which can be bolted or otherwise secured to the rear end of the engine block. Secured for rotation with the crankshaft 10 is a clutch housing indicated generally at 14 which is made up in part of a front wall portion 16 bolted or otherwise secured directly to a flange 18 on crankshaft 10. This front wall 16 can have secured thereto a ring gear 20 utilized for starting the engine, which ring gear is held in place by the customary bolts 22 fastening parts of the clutch housing 14 together. The front wall 16 has an axially extending formation 24 which serves as a backing plate for a clutch pack 26 made up of interleaved clutch plates splined to the housing 14 and to a part of the hub 28,

2 which in turn is splined to the output shaft 30. Output shaft 30 is piloted in a recess in the crankshaft 10 and is supported therein by anti-friction bearing 32. The other end of the crankshaft 30 is supported by anti-friction bearing 34 located in a part of the stationary casing.

The housing 14 has a rear wall 36 keyed by key 38 to a sleeve 40 rotatable relative to the output shaft 30 and hubs 28 splined thereto, but restrained against axial motion in one direction relative thereto by the abutment of one end of the sleeve 40 with a formation on the hub 28. The ring-like key 38 is held in the assembly by a snap ring 42. Pressure plate means indicated generally at 44 has a portion 46 splined to housing 14 and acted upon directly by coil springs 48 resting against the rear wall 36 of the clutch housing to move the part 46 into clutch engaging position relative to the clutch pack 26. The pressure plate means 44 has a cylindrical part 50 serving as one wall of an expansible chamber 52. A flange member 54 extending from sleeve 40 serves as another wall of the expansible chamber 52 while a hub-like portion 56 of clutch plate means 44 serves as the movable wall of the expansible chamber 52. Seals 58 and 60 are utilized, as shown, for limiting leakage from the chamber 52. Fluid under pressure can be supplied to this chamber by a passage made up of the conduit 62 drilled in a member 64 fastened to the casing 12. Passage 62 is in communication with a ring groove 66 in member 64 surrounding the output shaft 30. This shaft has two spaced holes 68 and 70 extending radially from a bore 72 drilled in the output shaft. The passage 70 is in communication with an enlargement 74 in the inner surface of sleeve 40 and such sleeve in turn has a fluid channel 76 extending therefrom to the expansible chamber 52.

The stationary part 64, before mentioned, is also supplied with a through drilled opening 78 in communication at each end with spaces 80 and with a radial passage 82. The passages 78 and 82 serve to expedite the return of fluid which may leak past sealing rings 84 into the spaces 80 so that such fluid can be readily returned to the source of pressure.

Fluid for lubricating and cooling the plates of pack 26 can be supplied from a source of pressure through the channels indicated at 86, 88 and 90. The fluid leaving the radial hole 90 will pass between the hub 28 and sleeve 40 and then will be in position to lubricate and cool the plates of the clutch pack. Oil can be returned from this pack by a passage 92 in the front wall 16 and a channel 94 in crankshaft 10. This cooling and lubricating fluid can be supplied from the engine lubricating pump in well known manner. Seal of various nature are employed wherever needed and being of a conventional character are not specifically identified herein.

In the operation of this clutch, it is contemplated that fluid such as lubricant under pressure from the engine lubricating pump will be utilized for releasing the normally engaged clutch pack. The particular means for supplying this fluid under pressure to the passage 62 forms no part of the present invention and, hence, is not illustrated or described herein. It will be apparent, however, that if the pack is engaged, as shown in FIGURE 1, by springs 48 for the transmission of drive from clutch housing 14 to hub 28 and output shaft 30 can be disengaged to interrupt this drive by supplying fluid under pressure to the passage 62 whence it will travel to the expansible chamber 52 causing the wall 56 of the pressure plate apply means to move to the right as viewed in the drawing. Such movement will release the pressure on the clutch pack and interrupt the beforementioned drive. Exhaust of this fluid from chamber 52 in a reverse line of travel will permit the springs 48, again, to engage the clutch.

In the embodiment of FIGURE 2, parts corresponding to those of FIGURE 1, have been given the same reference characters. The principal difference between these two embodiments is that the FIGURE 2 showing makes use of a Belleville spring washer 100 to normally apply the clutch instead of the coiled springs 48. The pressure plate clutch means of this embodiment, instead of being of integral formation, is made of two parts, a pressure plate part 102 proper splined to housing 14 and a part 104 keyed to part 102 for rotation therewith. This part 104 also has an expansible wall chamber part 56' corresponding to the part 56 of FIGURE 1. The annular member 54' extending integrally from sleeve 40 has a step 106 over which fits the inner boundary of spring 100. Snap ring 108 retains spring 100 in place. The outer boundary of spring 100 bears against a shoulder of the plate 102. Another slight difference in these embodiments is provided in the channel whereby lubricating and cooling fluid from pasage 86 reaches the clutch pack. In the FIGURE 2 arrangement this fluid will pass through the bearing 32 into the space 110 provided by ring 112 and then through the spline connection between hub 28 and output shaft 30 to passage 114 in hub 28. Fluid to be returned proceeds by passage 92' to the return opening 94.

The operation of this embodiment of the invention is identical in all respects to that previously described in that the Belleville spring 100 applies the clutch to transmit drive from the housing 14 to the hub 28 and output shaft 30. Fluid under pressure can be introduced into the chamber 52 in the manner previously described to move the wall 56' and plate 102 to the right disengaging the clutch.

The invention is to be limited only by the following claims:

We claim:

1. A clutch of the type described comprising a clutch housing, an output shaft coaxial with said clutch housing, a hub member within said housing and splined to the output shaft for rotation therewith, clutch plate members rotating respectively with said clutch housing and said hub, a sleeve surrounding said output shaft and having a radially outwardly extending wall, said sleeve being keyed to said housing for rotation therewith, pressure plate means including a wall member cooperating with said first mentioned wall to form an expansible chamber, said housing and pressure plate means having means for compelling said pressure plate means to rotate with said housing, biasing means for biasing said pressure plate means against said clutch plate members to engage the same, passage means for the supply of fluid to said expansible chamber to cause movement of said movable wall against spring pressure to disengage said clutch, and seal means between parts of said sleeve and said pressure plate means for preventing leakage from said expansible chamber.

2. A clutch of the type described comprising a clutch housing, an output shaft coaxial with said clutch housing, a hub member within said housing and splined to the output shaft for rotation therewith, a clutch pack comprising a plurality of plate discs interleaved and splined respectively to said clutch housing and said hub, a sleeve surrounding said output shaft and having a radially outwardly extending wall, said sleeve being keyed to said housing for rotation therewith, pressure plate means including a wall member cooperating with said first mentioned wall to form an expansible chamber, said housing and pressure plate means having means for compelling said pressure plate means to rotate with said housing, biasing means for biasing said pressure plate means against said clutch pack to engage the same, passage means for the supply of fluid to said expansible chamber to cause movement of said movable wall against spring pressure to disengage said clutch, seal means between parts of said sleeve and said pressure plate means for preventing leakage from said expansible chamber, and passage way means for the supply of cooling and lubricating fluid to said clutch pack.

3. A clutch of the type described comprising a clutch housing, an output shaft coaxial with said clutch housing, a hub member within said housing and splined to the output shaft for rotation therewith, a clutch pack comprising a plurality of plate discs interleaved and splined respectively to said clutch housing and said hub, a sleeve surrounding said output shaft and having a radially outwardly extending wall, said sleeve being keyed to said housing for rotation therewith, integral pressure plate means including a wall member cooperating with said first mentioned said wall member to form an expansible chamber, said housing and pressure plate means having means for compelling said pressure plate means to rotate with said housing, biasing means for biasing said pressure plate means against said clutch pack to engage the same, passage means for the supply of fluid to said expansible chamber to cause movement of said movable wall against spring pressure to disengage said clutch, and seal means between parts of said sleeve and said pressure plate means for preventing leakage from said expansible chamber.

4. A clutch of the type described comprising a cluch housing, an output shaft coaxial with said clutch housing, a hub member within said housing and splined to the output shaft for rotation therewith, a clutch pack comprising a plurality of plate discs interleaved and splined respectively to said clutch housing and said hub, a sleeve surrounding said output shaft and having a radially outwardly extending wall, said sleeve being keyed to said housing for rotation therewith, integral pressure plate means including a wall member cooperating with said first mentioned said wall member to form an expansible chamber, said housing and pressure plate means having means for compelling said pressure plate means to rotate with said housing, biasing means for biasing said pressure plate means against said clutch pack to engage the same, passage means for the supply of fluid to said expansible chamber to cause movement of said movable wall against spring pressure to disengage said clutch, seal means between parts of said sleeve and said pressure plate means for preventing leakage from said expansible chamber, and passage way means for the supply of cooling and lubricating fluid to said clutch pack.

5. A clutch of the type described comprising a clutch housing, an output shaft coaxial with said clutch housing, a hub member within said housing and splined to the output shaft for rotation therewith, a clutch pack comprising a plurality of plate discs interleaved and splined respectively to said clutch housing and said hub, a sleeve surrounding said output shaft and having a radially outwardly extending wall, said sleeve being keyed to said housing for rotation therewith, pressure plate means including a wall member cooperating with said first mentioned said wall member to form an expansible chamber, said housing and pressure plate means having means for compelling said pressure plate means to rotate with said housing, a spring washer acting on said pressure plate to force it against said clutch pack to engage the same, passage means for the supply of fluid to said expansible chamber to cause movement of said movable wall to disengage said clutch, and seal means between parts of said sleeve and said pressure plate means for preventing leakage from said expansible chamber.

6. A clutch of the type described comprising a clutch housing, an output shaft coaxial with said clutch housing, a hub member within said housing and splined to the output shaft for rotation therewith, a clutch pack comprising a plurality of plate discs interleaved and splined respectively to said clutch housing and said hub, a sleeve surrounding said output shaft and having a radially outwardly extending wall, said sleeve being keyed to said housing for rotation therewith, pressure plate means including a wall member cooperating with said first mentioned said wall member to form an expansible chamber, said housing and pressure plate means having means for compelling said pressure plate means to rotate with said housing, a spring washer acting on said pressure plate to force it against said clutch pack to engage the same, passage means for the supply of fluid to said expansible chamber to cause movement of said movable wall to discharge said clutch, seal means between parts of said sleeve and said pressure plate means for preventing leakage from said expansible chamber, and passage way means for the supply of cooling and lubricating fluid to said clutch pack.

References Cited in the file of this patent
UNITED STATES PATENTS

| | | |
|---|---|---|
| 2,709,926 | Jandasek | June 7, 1955 |
| 2,726,748 | Quistgaard et al. | Dec. 13, 1955 |
| 2,775,331 | Peterson | Dec. 25, 1956 |
| 2,901,066 | Garmager | Aug. 25, 1959 |

UNITED STATES PATENT OFFICE
CERTIFICATE OF CORRECTION

Patent No. 3,145,816                                August 25, 1964

John Z. De Lorean et al.

It is hereby certified that error appears in the above numbered patent requiring correction and that the said Letters Patent should read as corrected below.

Column 5, line 12, for "discharge" read -- disengage --.

Signed and sealed this 26th day of January 1965.

(SEAL)
Attest:

ERNEST W. SWIDER                                  EDWARD J. BRENNER
Attesting Officer                                   Commissioner of Patents